United States Patent [19]
Risca

[11] Patent Number: 5,154,380
[45] Date of Patent: Oct. 13, 1992

[54] CONTAINER HOLDER

[76] Inventor: Mihai Risca, 26417 Rialto, Madison Heights, Mich. 48071

[21] Appl. No.: 576,053

[22] Filed: Aug. 31, 1990

[51] Int. Cl.⁵ .................................................. A47G 23/02
[52] U.S. Cl. .................................. 248/154; 248/311.2; 248/313
[58] Field of Search ............. 248/154, 310, 313, 311.2, 248/316.4, 172, 314, 346.1, 146; 220/85 H; 224/42.45 R, 29 G, 30 A; D7/45, 70

[56] References Cited

U.S. PATENT DOCUMENTS

| | | | |
|---|---|---|---|
| 168,673 | 10/1875 | Rosenfeld . | |
| 358,688 | 3/1887 | Nassauer | 248/154 |
| 385,522 | 7/1888 | Pierce | 248/310 |
| 1,365,405 | 1/1921 | Howard | 248/310 X |
| 1,828,249 | 10/1931 | Hammond . | |
| 2,235,839 | 3/1941 | McEnery | 248/350 |
| 2,313,115 | 3/1943 | Allen et al. | 248/310 |
| 2,483,188 | 9/1949 | Elger | 248/154 V X |
| 3,248,120 | 4/1966 | Volpe | 279/71 |
| 3,844,460 | 10/1974 | Courtright | 224/45 |
| 4,040,549 | 8/1977 | Sadler | 220/85 H X |
| 4,118,002 | 10/1978 | Bartlett | 248/311.2 |
| 4,596,370 | 6/1986 | Adkins | 224/30 A |
| 4,643,381 | 2/1987 | Levy | D7/45 X |
| 4,693,440 | 9/1987 | Lalonde | 248/313 X |
| 4,836,488 | 6/1989 | Ross | 248/346.1 |
| 4,919,381 | 4/1990 | Buist | 224/42.45 |

Primary Examiner—J. Franklin Foss
Attorney, Agent, or Firm—Reising, Ethington, Barnard, Perry & Milton

[57] ABSTRACT

The container holder includes a base on which a plurality of upstanding, spring biased tangs are disposed for radial movement relative to an imaginary common center point to accomodate and hold containers of different sizes. The tangs include outwardly diverging upper protions which are engaged by the bottom of the container as it is lowered onto the base. This engagement results in outward spreading of the tangs apart to accommodate a particular size container. Lower portions of the tangs are spring biased against the side periphery of the container to hold it upright when the container bottom rests on the base.

14 Claims, 1 Drawing Sheet

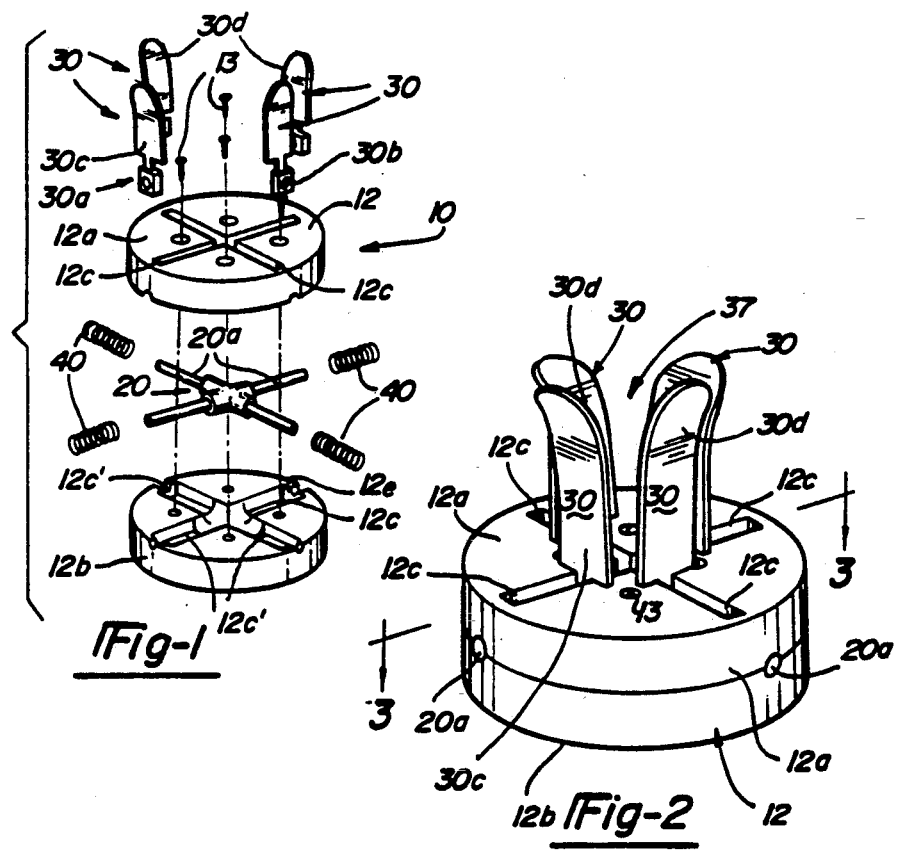
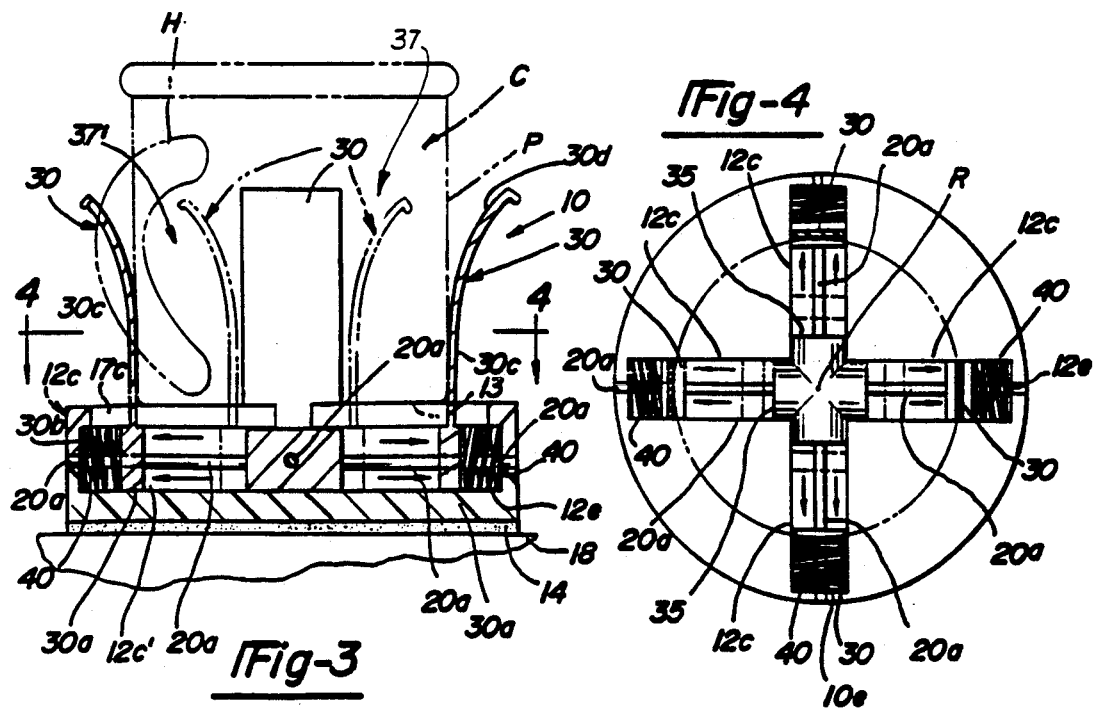

CONTAINER HOLDER

FIELD OF THE INVENTION

The present invention relates to a holder device for holding containers, especially containers having different sizes, e.g., different diameters.

BACKGROUND OF THE INVENTION

Many modern motor vehicles and boats include components, such as arm rests, glove box lids, accessory trays, etc. that have one or more container holders for holding a cup, bottle or can. However, these containers are usually adapted to securely hold only one common size of container.

An object of the present invention is to provide a "universal" container holder device that is capable of securely holding a relatively wide range of container sizes; for example, containers of $1\frac{1}{2}$ inches diameter to 3 inches diameter.

Another object of the present invention is to provide such a "universal" container holder device which automatically adjusts for different sizes of containers to hold them securely in an upright position, all without the need for any manual adjustment of the holder device.

Still another object of the present invention is to provide such a "universal" container holder device which can be readily incorporated in a motor vehicle such as an automobile, boat and the like.

SUMMARY OF THE INVENTION

The present invention contemplates a container holder device comprising a base for supporting the bottom of containers of different size and a plurality of upstanding tangs or members disposed on the base for radial movement relative to an imaginary common center point such that the tangs collectively define therewithin an upstanding receptacle of variable size for receiving containers of different size. The size of the receptacle is variable in dependence upon the position of the tangs relative to the common center point. Each tang includes an upper portion that diverges outwardly away from the common center point for initial, temporary engagement with the bottom of the container and an upstanding lower portion for engaging the side periphery of the container when the container bottom is supported on the base.

In particular, the upper portions of the tangs are disposed for engagement by the bottom of a particular container as it is lowered toward the base so as to spread the tangs radially apart to accommodate the size of the particular container as it is lowered toward and supported on the base. The lower portions of the tangs are biased toward the common center point such that they engage the side periphery of the container and provide lateral support to the container to hold it securely upright when it is supported on the base.

In one embodiment of the invention, each tang includes a bottommost tongue slidably received in a corresponding groove in the base in such a manner as to substantially prevent wobbling or other unwanted movement of the tangs. The tongue of each tang is mounted on a guide member in each groove to facilitate the movement of the tangs required to accommodate different size containers. Stops are formed on the guide members or on the base to limit movement of the tangs toward the common center point. Each tang is spring biased toward the stops to establish a preselected minimum receptacle size slightly smaller than the smallest size container to be held.

The holder device preferably includes means for fastening the base to a motor vehicle such as an automobile, boat and the like. Such means may comprise an adhesive pad or VELCRO ® fastener on the base.

The aforementioned objects and advantages of the present invention will become more readily apparent from the detailed description taken with the following drawings.

BRIEF DESCRIPTION OF THE DRAWINGS

FIG. 1 is an exploded view of a container holder device in accordance with the invention.

FIG. 2 is a perspective of the container holder device with tangs at the innermost radial positions to define a preselected minimum receptacle size.

FIG. 3 is a sectioned, side elevation of the container holder device along line 3—3 of FIG. 2 with the tangs expanded radially to accommodate a larger container (shown in phantom).

FIG. 4 is a view taken along lines 4—4 of FIG. 3.

DETAILED DESCRIPTION OF THE INVENTION

The container holder device 10 of the invention is illustrated in FIG. 3 securely holding a container (shown in phantom as a cup C having a handle H) in an upright position. However, the holder device 10 is not limited to holding cups and is capable of holding other containers such as beverage cans, bottles, glasses and the like having a generally cylindrical side periphery P.

As is apparent, the bottom B of the container C is supported on the base 12 of the holder device 10. Although a cylindrical disk-shaped base 12 is shown in FIGS. 1-4, it may be any shape. The base 12 itself is preferably mounted on a motor vehicle such as an automobile, boat and the like, by means of an adhesive pad 14 (FIG. 3) or other fastening means, such as a VELCRO ® fastener, mechanical clamps, suction pads, and the like. The base 12 is typically mounted on the dashboard or other support 18 in the cabin of the motor vehicle, boat and the like as those skilled in the art will appreciate.

Referring to FIGS. 1-4, the base 12 includes upper and lower members 12a,12b fastened together by mechanical fasteners 13 (e.g., screws) or by other means, such as adhesive. The base 12 may be molded plastic, metal, wood or other suitable material. The upper base member 12a includes a plurality of grooves 12c extending radially from an imaginary common center point R, FIG. 4. Four such grooves 12c are shown equidistantly spaced apart (i.e., 90° apart) around the common center point R. The lower base member 12b also includes radially extending grooves 12c' that are aligned beneath the grooves 12c when the upper and lower base members 12a,12b are assembled.

Supported on the lower section 12b in the grooves 12c, is a support cross 20 comprising four support legs 20a spaced equidistantly so as to align beneath a respective groove 12c. The cross 20 may be made of various materials, although metal is preferred for friction reduction purposes as will be explained hereinbelow.

In FIGS. 1-4, it is apparent that a plurality of upstanding tangs or members 30 are carried on the support cross or guide 20 in the grooves 12c,12c'. The tangs 30 are spaced equidistantly apart around the common center part R. As a result of the spacing between the tangs 30, the handle H of the container C (cup) can be accommodated. Each tang 30 includes a bottommost contoured tongue 30a received on a respective guide leg 20a in respective aligned grooves 12c,12c'. Each tongue 30a includes a radially extending passage 30b through which a respective guide leg 20a extends for slidably supporting the respective tang. A metallic support cross or guide 20 is preferred when tangs 30 are made of plastic so as to minimize friction therebetween. The tangs 30 may be made of other materials, however. The tongue and groove fit of each tang 30 is so selected as to substantially prevent wobbling and other unwanted side-to-side and back-and-forth tilting movement of the tangs 30. The tongues 30a of the tang 30 may be slidably supported on the base 10 in other ways that do not require the support cross 20.

The tongue 30a of each tang 30 is biased toward the common center point R by a coil spring 40 disposed about a respective leg 20a between each tongue 30a and the side 12e of the lower base member 12b, FIG. 3. Movement of the tangs 30 inwardly toward the common center point R is limited by enlarged stops 35 formed on the cross legs 20a (or, alternately on the base 12). In particular, the tongues 30a of the tangs 30 will engage the stops 35 when no container is present so as to define an upstanding, generally cylindrical container receptacle 37 of selected minimum size (e.g., diameter), FIG. 2.

Each tang 30 includes an upstanding lower portion 30c and an outward diverging or flaring upper portion 30d. The upstanding lower portion 30c has a vertical length that is sufficient to provide lateral or side support to the cup C to securely maintain its upright orientation as will be explained. Typically, the length of the lower portion 30c of each tang 30 is approximately one-half the total height of the container C to be held in order to provide adequate lateral support of the side periphery P of the container.

The upward, outward divergence of portions 30d of tangs 30 is so selected that the upper portions 30d are collectively engaged by the bottom B of a container C larger than the minimum receptacle size as it is lowered toward the base 10 and effect a spreading of the tangs 30 radially apart (outward in the Figures) to accommodate the size (e.g., diameter) of the particular container C when it is finally supported on the base 12. In effect, the size (e.g., diameter) of the receptacle 37 is automatically increased (up to a prescribed limit controlled by the horizontal length of the grooves 12c,12c') as necessary to accommodate the larger size container without any need for manual adjustment by the person attempting to position the container in the receptacle 37. This automatic size adjustment occurs as a result of the outward cam action exerted by the bottom B of the container C on the upwardly diverging upper portions 30d as the container is lowered toward the base 12. Larger receptacle 37' is thereby provided for container C, FIG. 3.

The radially outward movement of the tangs 30 is counter to the bias of springs 40 and causes compression of the springs 40. As a result, the lower portions 30c of the tangs 30 are biased against the side periphery P of the container C when it is supported on the base 12 to provide lateral support and securely hold the container C in an upright orientation on the base 12.

The container C is readily removed from the holder device 10 simply by lifting it upwardly out of the receptacle 37' defined by tangs 30. Upon removal, the tangs 30 are biased by springs 40 to establish the minimum size receptacle 37, FIG. 2, resulting from engagement of the tongues 30a and the stops 35.

Those skilled in the art will appreciate that spring arrangements and locations other than the outer coil springs 40 shown can be used in practicing the invention to establish, with suitable stops, the minimum size receptacle.

As an exemplary illustration only, the container holder device 10 of the invention may be designed to hold containers C having an outer diameter of between 1½ inches to 3 inches. In this case, the minimum size receptacle 37 (established by tongues 30a biased against stops 35) would typically be slightly less than 1½ inches diameter so that some outward radial spreading of the tangs 30 would occur even with the smallest (1½ inch diameter) container so that a secure positive holding action is exerted by the lower tang portions 30c on the side periphery P of the container C. Larger containers would cause correspondingly greater outward radial spreading of tangs 30 in order to be accommodated.

The container holder device of the invention advantageously requires no manual manipulation of the device itself to hold a particular container. All that is necessary is lowering of the container C until it rests on the base 12. Removal of the container C simply involves lifting it out of the tangs 30.

While the invention has been described in terms of specific embodiments thereof, it is not intended to be limited thereto but rather only to the extent set forth hereafter in the following claims.

I claim:

1. A holder device for holding different size containers including cups, bottles and cans, comprising a base for supporting the bottom of containers of different size and fastenable to a support, a plurality of upstanding tangs disposed on the base for radial movement relative to a common center point such that the tangs collectively define therewithin an upstanding receptacle of variable size depending upon the position of the tangs relative to the common center point for receiving the side periphery of containers of different size, means disposed outboard of each tang between each said tang and said base for biasing the tangs toward the common center point, and each tang having an upstanding lower portion and an outwardly diverging upper portion, the upper portions of said tangs being disposed for engagement by the bottom of a particular container as it is lowered toward the base so as to spread the tangs radially apart if necessary to accommodate the size of the particular container when it is supported on said base and the lower portions of said tangs being biased against the side periphery of the particular container when it is supported on said base.

2. The device of claim 1 wherein the tangs are spaced equidistantly apart on the base.

3. The device of claim 1 wherein each tang includes a bottommost tongue movably received in a respective groove in said base.

4. The device of claim 3 wherein each tongue is slidably mounted on an elongated member suspended in each groove.

5. The device of claim 4 wherein each tongue includes a radial passage through which the elongated member extends.

6. The device of claim 1 wherein the biasing means comprises a spring cooperatively associated with each tang for biasing it toward the common center point.

7. The device of claim 1 further including stop means for so limiting movement of the tangs toward the common center point as to establish a selected minimum receptacle size.

8. The device of claim 1 wherein said base includes means for fastening the base to an underlying support on a motor vehicle, boat and the like.

9. A holder device for holding different size containers including cups, bottles and cans, comprising a base for supporting the bottom of containers of different size, said base having a plurality of grooves extending radially relative to a common center point, a tang support disposed on the base and having a plurality of legs extending radially relative to the common center point beneath a respective groove, a plurality of upstanding tangs each disposed on a respective leg with each tang having a bottommost tongue received in a respective groove for radial movement relative to the common center point such that the tangs collectively define therewithin an upstanding receptacle of variable size depending upon the position of the tangs relative to the common center point for receiving the side periphery of containers of different size, means for biasing the tangs toward the common center point, stop means for so limiting movement of the tangs toward the common center point as to establish a selected minimum receptacle size, and each tang having an upstanding lower portion and an outwardly diverging upper portion, the upper portions of said tangs being disposed for engagement by the bottom of a particular container having a size greater than the minimum receptacle size so as to spread the tangs radially apart to accommodate the greater size of the particular container when it is supported on said base and the lower portions of said tangs being biased against the side periphery of the container when it is supported on said base.

10. The device of claim 9 including means for fastening the base on a motor vehicle, boat and the like.

11. A holder device for holding different size containers including cups, bottles and cans, comprising a base for supporting the bottom of containers of different size, a tang support disposed on the base and having a plurality of legs extending radially relative to a common center point and spaced angularly thereabout, a plurality of upstanding tangs each disposed on a respective leg for radial movement relative to the common center point such that the tangs collectively define therewithin an upstanding receptacle of variable size depending upon the position of the tangs relative to the common center point for receiving the side periphery of containers of different size, means disposed about each respective leg outboard of each respective tang for biasing the tangs toward the common center point, and each tang having an upstanding lower portion and an outwardly diverging upper portion, the upper portions of said tangs being disposed for engagement by the bottom of a particular container as it is lowered toward the base so as to spread the tangs radially apart if necessary to accommodate the size of the particular container when it is supported on said base and the lower portions of said tangs being biased against the side periphery of the particular container when it is supported on said base.

12. The device of claim 11 wherein each leg includes a stop thereon for limiting movement of the tangs toward the common center point.

13. A holder device for holding different size containers including cups, bottles and cans comprising a base for supporting the bottom of containers of different size, a tang support cross disposed on the base and having a plurality of legs extending radially relative to a common center point and spaced angularly equidistant thereabout, said legs being accessible from above said base via a plurality of radially extending grooves therein each overlying a respective leg, a plurality of upstanding tangs each including a portion extending through a respective groove for slidably engaging on a respective guide leg for radial movement relative to the common center point such that the tangs collectively define therewithin an upstanding receptacle of variable size depending upon the position of the tangs relative to the common center point for receiving the side periphery of containers of different size, means disposed about each respective leg outboard of each tang for biasing the tangs toward the common center point, and each tang having an upstanding lower portion and an outwardly diverging upper portion, the upper portions of said tangs being disposed for engagement by the bottom of a particular container as it is lowered toward the base so as to spread the tangs radially apart if necessary to accommodate the size of the particular container when it is supported on said base and the lower portions of said tangs being biased against the side periphery of the particular container when it is supported on said base.

14. The device of claim 13 wherein each leg includes a stop thereon for limiting movement of the tangs toward the common center point.

* * * * *